(12) United States Patent
Satish

(10) Patent No.: US 8,595,211 B1
(45) Date of Patent: Nov. 26, 2013

(54) TECHNIQUES FOR MANAGING SEARCH ENGINE RESULTS

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 283 days.

(21) Appl. No.: 13/035,810

(22) Filed: Feb. 25, 2011

(51) Int. Cl.
*G06F 7/00* (2006.01)
*G06F 17/30* (2006.01)
*G06F 11/00* (2006.01)

(52) U.S. Cl.
USPC .............................. 707/709; 707/754; 726/22

(58) Field of Classification Search
None
See application file for complete search history.

(56) References Cited

U.S. PATENT DOCUMENTS

| | | | |
|---|---|---|---|
| 7,539,482 B2 * | 5/2009 | Kitano et al. | 455/412.1 |
| 8,074,083 B1 * | 12/2011 | Lee et al. | 713/194 |
| 2006/0161542 A1 * | 7/2006 | Cucerzan et al. | 707/5 |
| 2009/0106279 A1 * | 4/2009 | Bae | 707/100 |
| 2009/0248696 A1 * | 10/2009 | Rowles et al. | 707/10 |
| 2010/0138382 A1 * | 6/2010 | Nagoya et al. | 707/609 |
| 2011/0138467 A1 * | 6/2011 | Macwan et al. | 726/24 |

* cited by examiner

*Primary Examiner* — Uyen Le

(74) *Attorney, Agent, or Firm* — Wilmer Cutler Pickering Hale and Dorr LLP

(57) ABSTRACT

Techniques for managing search engine results may include, for example, a method for managing search engine results comprising receiving a search engine result and associated summary content, receiving requested content associated with the search engine result, comparing, using a computer processor, the summary content and the received requested content, and performing one or more actions in the event the summary content does not match the received requested content.

20 Claims, 6 Drawing Sheets

TECHNIQUES FOR MANAGING SEARCH ENGINE RESULTS

FIELD OF THE DISCLOSURE

The present disclosure relates generally to network security and, more particularly, to techniques for managing search engine results.

BACKGROUND OF THE DISCLOSURE

Web search engines process huge queries across large web indexes built for billions of pages and petabytes of data (both of which may continue to grow at a rapid pace). Web search engines may also have tight latency constraints. Search engines may typically use three major components: Caches, index servers, and document servers. Large result caches may be used to store previously computed query results over billions of pages crawled by large clusters. As the crawlers are crawling these pages and retrieving page contents, there may be two major challenges. First, pages may change more frequently than a crawler can update a search engine. This may lead to outdated search results that may not be found when a user clicks on a result or may be different from the summary content displayed in a search result listing.

Second, a malicious website may be able to distinguish between types of requestors such as a search engine bot versus a user at a browser. Specifically, a malicious website may identify a search engine bot (or crawler) via User-Agent properties in an request, an IP range associated or other request attributes and may respond with a first set of content for a page that may be designed to achieve a high search engine ranking. Many automated attack kits may build lots of pages for top searched keywords, link them together and even build the content dynamically using other pages such as, for example, wiki entries, news entries, etc. These attack kits may be directed towards getting a page listed in the top search results for the most searched keywords to attract users. Search engine results may contain brief text along with the key subject of the page on the search results listing which may persuade a user that the page is genuine and relevant. Once a user clicks on a search result and the malicious site determines that the request is not from a crawler or search bot, the malicious site may deliver completely different content such as, for example, a fake anti-virus scan page or perform other social engineering attacks to trick the user to download malicious content or even perform "drive by download" type of attacks in which malware may be automatically downloaded. Web users may suffer from malware, misleading applications, and/or stale content.

In view of the foregoing, it may be understood that there may be significant problems and shortcomings associated with current search engine results management technologies.

SUMMARY OF THE DISCLOSURE

Techniques for managing search engine results are disclosed. In one particular exemplary embodiment, the techniques may be realized as a method for managing search engine results comprising receiving a search engine result and associated summary content, receiving requested content associated with the search engine result, comparing, using a computer processor, the summary content and the received requested content, and performing one or more actions in the event the summary content does not match the received requested content.

In accordance with other aspects of this particular exemplary embodiment, the one or more actions may comprise notifying a search engine that the summary content does not match the received requested content.

In accordance with other aspects of this particular exemplary embodiment, the techniques may further comprise expediting crawling web content based upon a received notification that summary content does not match the received requested content.

In accordance with further aspects of this particular exemplary embodiment, the techniques may further comprise delisting a network address based upon a determination that received requested content is malicious.

In accordance with additional aspects of this particular exemplary embodiment, the one or more actions may comprise indicating to a user that summary content is stale.

In accordance with additional aspects of this particular exemplary embodiment, the one or more actions may comprise providing the received requested content to a user.

In accordance with additional aspects of this particular exemplary embodiment, the one or more actions may comprise blocking the received requested content.

In accordance with additional aspects of this particular exemplary embodiment, the one or more actions may comprise warning a user regarding potential malicious content associated with the received requested content.

In accordance with additional aspects of this particular exemplary embodiment, the one or more actions may comprise preventing downloads from a network address associated with the received requested content.

In accordance with additional aspects of this particular exemplary embodiment, the one or more actions may comprise one or more of: disabling at least a portion of browser functionality of a browser receiving the received requested content, disabling instantiation of ActiveX controls on a page associated with the received requested content, and preventing interaction with a web form of a page associated with the received requested content.

In accordance with additional aspects of this particular exemplary embodiment, the one or more actions may comprise providing a notification to at least one of: an administrator, a security software vendor, a third party solution provider, and one or more additional search engine clients.

In accordance with additional aspects of this particular exemplary embodiment, the techniques may further comprise determining which of the one or more actions to perform based on at least one of: a similarity of the received requested content to the summary content derived from the comparison, a policy, and an analysis of the received requested content.

In accordance with additional aspects of this particular exemplary embodiment, the techniques may further comprise determining that the received requested content is associated with one or more of malware and misleading content, wherein the determination is based on one or more of: a signature, behavioral analysis, and reputation based analysis.

In accordance with additional aspects of this particular exemplary embodiment, comparing may comprise performing a string search for one or more portions of the summary content in the received requested content.

In accordance with additional aspects of this particular exemplary embodiment, one or more portions of functionality may be performed by at least one of: a browser API, a browser plug-in, and a browser component.

In accordance with additional aspects of this particular exemplary embodiment, one or more portions of functionality may be performed by a gateway, a web proxy, and a search engine.

In accordance with additional aspects of this particular exemplary embodiment, the techniques may be realized as at least one processor readable non-transitory storage medium for storing a computer program of instructions configured to be readable by at least one processor for instructing the at least one processor to execute a computer process for performing the method.

In another particular exemplary embodiment, the techniques may be realized as an article of manufacture for managing search engine results, the article of manufacture comprising at least one non-transitory processor readable medium, and instructions stored on the at least one medium. The instructions may be configured to be readable from the at least one medium by at least one processor and thereby cause the at least one processor to operate so as to receive a search engine result and associated summary content, receive requested content associated with the search engine result, compare, using a computer processor, the summary content and the received requested content, and perform one or more actions in the event the summary content does not match the received requested content.

In yet another particular exemplary embodiment, the techniques may be realized as a system for managing search engine results comprising one or more processors communicatively coupled to a network, wherein the one or more processors are configured to receive a search engine result and associated summary content, receive requested content associated with the search engine result, compare, using a computer processor, the summary content and the received requested content, and perform one or more actions in the event the summary content does not match the received requested content.

In accordance with additional aspects of this particular exemplary embodiment, the one or more processors may further be configured to expedite crawling web content based upon a received notification that summary content does not match the received requested content.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
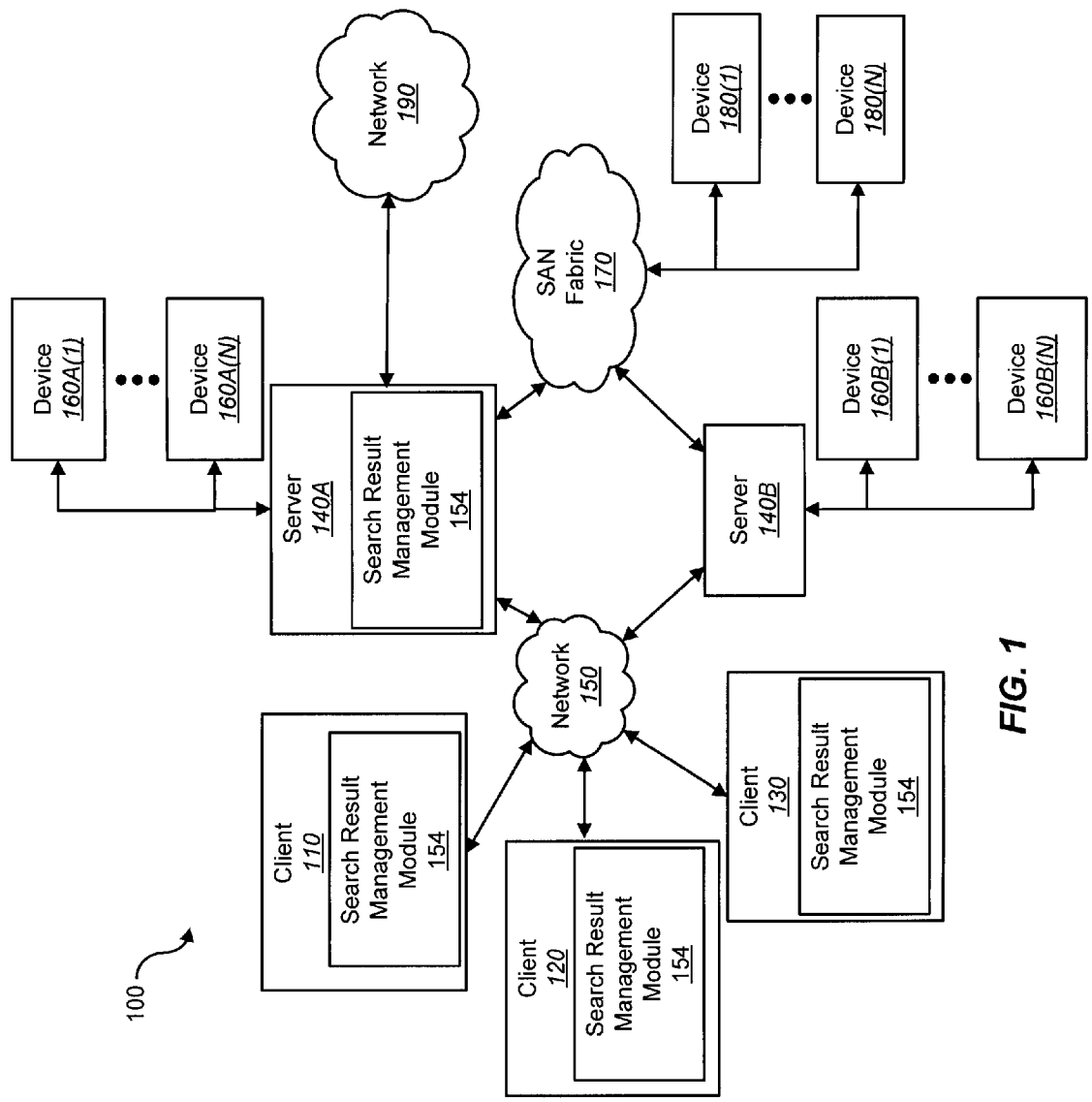
FIG. 1 shows a block diagram depicting a network architecture for managing search engine results in accordance with an embodiment of the present disclosure.

FIG. 1 shows a block diagram depicting a network architecture 100 for managing search engine results in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., search result management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190.

The description below describes network elements, computers, and/or components of a system and method for managing search engine results that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
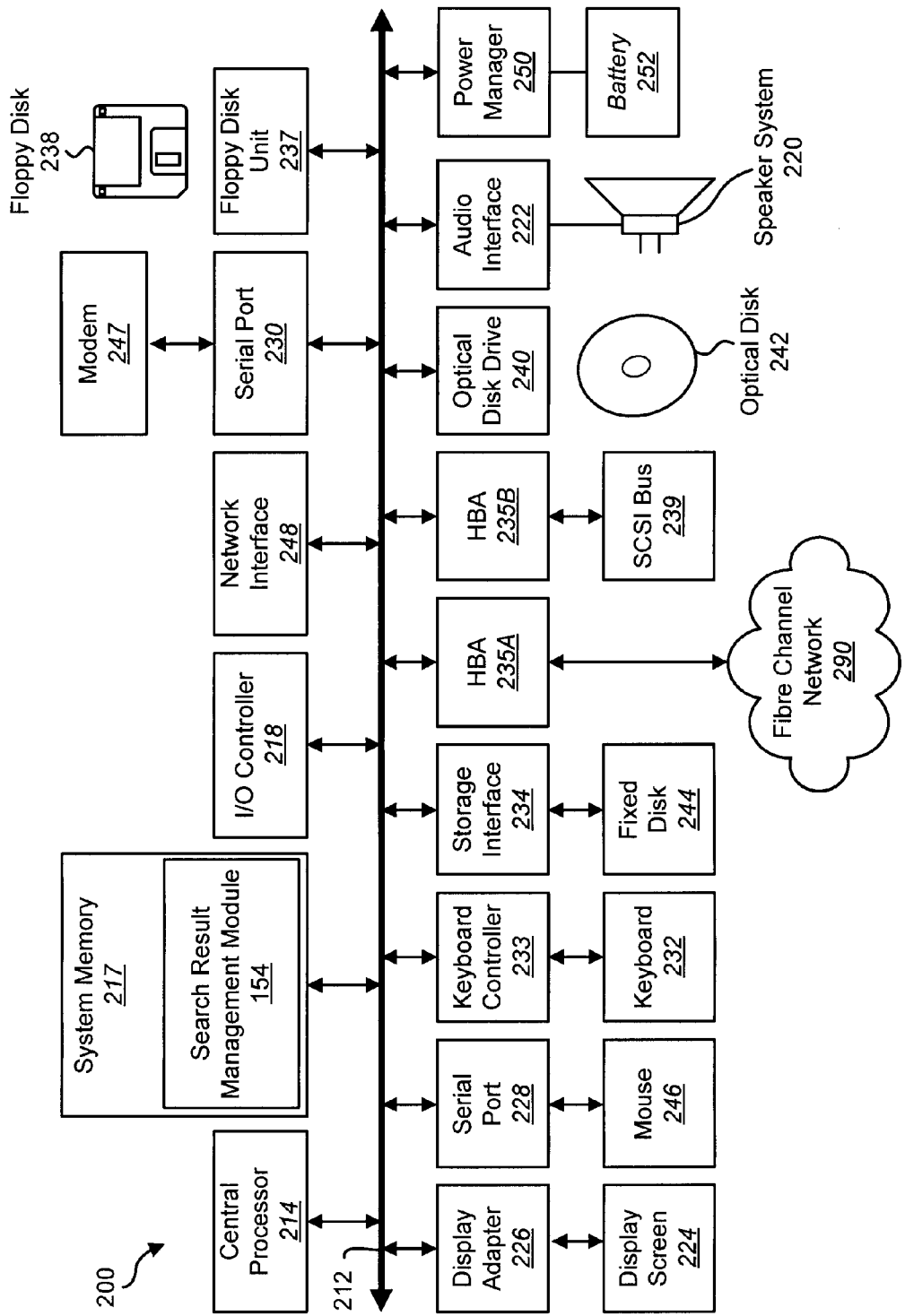
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for managing search engine results such as, for example, search result management module 154. As illustrated, one or more portions of search result management module 154 may reside at a client. One or more portions of search result management module 154 may reside at a network centric location. For example, server 140A may be a server, a firewall, a proxy server, a gateway, a search engine, or other network element that may perform one or more actions to gather, identify, and/or block an malicious search engine result and/or to identify stale or misleading search engine results. According to some embodiments, network 190 may be an external network (e.g., the Internet) and server 140A may be a gateway, proxy server, a search engine, and/or firewall between one or more internal components and clients and the external network.

According to some embodiments, search result management module 154 may be implemented in several portions which may be co-located or located remote from one another. As discussed, above one or more portions of search result management module 154 may reside on server 140A and may analyze and detect malicious search engine results and/or stale or misleading search results. Indications of detected malicious search engine results may be provided to one or more modules of search result management module 154 residing on server 140A and/or clients 110, 120, and 130.

According to some embodiments, clients 110, 120, and/or 130 may contain one or more modules of search result management module 154. If a search engine result is indicated as malicious or stale one or more modules of search result management module 154 residing on a client may deny access to the search engine result, may provide a warning associated with the search engine result, and/or may activate security software to address a malware threat. For example, a component of search result management module 154 may be a browser plug-in or a browser bar which may perform one or more actions to protect a user of the browser from detected malicious search engine results. A browser plug-in or a browser bar may also inform a user of received content which does not match summary search engine content.

According to some embodiments, search result management module 154 may store or access summary search engine result summary information received in response to a web search (e.g., a search performed by client 110, 120, and/or 130). Summary search result summary information may contain information retrieved by a search engine while crawling a webpage. When a web search is performed a search engine may traverse an index using keywords contained in the search to retrieve relevant summary search engine results. Some search engine embodiments may cache one or more portions of search result summary information. Search result management module 154 may store or access these results as they are provided to a web search requestor (e.g., client 110, 120, and/or 130). When a search result is requested (e.g., a user of client 110, 120, and/or 130 clicks on a result link) search result management module 154 may compare results received in response to a request with search engine result summary information. According to some embodiments, search result management module 154 may search for a portion of search result summary information in the results received in response to the request. For example, search result management module 154 may use a string of text from search engine result summary information and use a string search, regular expressions, or other mechanisms to compare the string from the summary results to the received results. A match containing an entire substring may indicate that the summary search engine results accurately represent the contents of the webpage. No match or an approximate substring match (e.g., minor variations found and/or a match occurred after normalization of a string and/or results) may indicate modified content, updated content, stale cached summary results, and/or malicious or misleading content. If a match is made received results may be provided to a requestor. If an approximate match is made, according to some embodiments, further analysis may be performed to determine whether received results are current, safe, and/or relevant. If an approximate match is made a user may be provided with a warning or message regarding potential irrelevant or harmful content. According to some embodiments, if a match is not made one or more actions may be taken. Actions may be determined by one or more configurable policies. Determining which of the one or more actions to perform may be based on one or a similarity of the received requested content to the summary content derived from a comparison, a policy, and/or an analysis of the received requested content. Actions may be directed towards providing web user safety and reducing irrelevant, misleading, and outdated search results.

According to some embodiments, if a substring match is not made search result management module 154 may perform one or more actions to reduce a potential threat from malware and/or misleading applications. Malware may include misleading applications messages such as, for example, a fake anti-virus software product, a fake network security software product, a fake anti-spyware software product, a fake computer disk optimization software product, a fake operating system update software product, a fake operating system registry tool software product, and/or a fake computer optimization software product. Security measures to reduce such threats may include blocking the received requested content, warning a user regarding potential malicious content associated with the received requested content, and/or preventing downloads from a network address or web page associated with the received requested content. Other actions may include disabling at least a portion of browser functionality of a browser receiving the received requested content (e.g., disabling a JavaScript engine), disabling instantiation of ActiveX controls on a page associated with the received requested content, and/or preventing interaction with a web form of a page associated with the received requested content. Disabling functionality, forms, downloads and other web interaction may prevent the download of malware, the execution of malware, the gathering of sensitive information (e.g., user names, passwords, pins, account information, personal information, etc.). According to some embodiments, the restrictions may be configurable and/or set by one or more policies. Further analysis may be performed including the use of signatures to identify malware, behavioral analysis, and/or reputation based analysis (e.g., identifying network addresses associated with the received content as known malicious sites).

In addition to security measures, search result management module 154 may notify additional parties and/or devices of received content which does not match summary content provided by a search engine (e.g., retrieved and/or cached by a search engine). For example, notifications (e.g., emails, text messages, etc.) may be provided to one or more of an administrator, a security software vendor, a third party solution provider, one or more search engine clients, and/or one or more security software clients. Notifications may be used by receiving parties to perform additional analysis, security actions, search engine cache updates, and other actions. Additionally, search result management module 154 may communicate to a user that received content does not match summary content provided by a search engine. Notifications to a user may be provided by an alert in a browser such as via a message in an address bar. According to some embodiments, a user may be redirected to a warning page requiring confirmation prior to receiving changed content. A user may also be notified that certain functionality may be disabled (e.g., JavaScript engine, ActiveX controls, etc.) for security. A user may also be notified that received content has changed since it was indexed by a search engine (e.g., the user's search results were stale).

Content which does not match summary content provided by a search engine may not indicate a security problem, it may indicate that summary search engine results are stale (e.g., outdated cached pages) and may need to be updated. Web content may change quickly; faster than search engine summary information and/or caches can be updated and indexes updated. Identifying how much web content has changed or is completely different may be used to determine what actions search result management module 154 may take. According to some embodiments, a whitelist may be used to identify known safe sites which change their content frequently.

According to one or more embodiments, search result management module 154 may notify a search engine that the summary content does not match the received requested content. Search result management module 154 may indicate to a search engine that web crawling for content should be expedited. Notifying a search engine that the page and/or content and the summary and indexed page information is not synchronized can be delivered to the community of the users of the security agent and/or to the search engine provider. A search engine may benefit from expiring the corresponding result summary and/or cache entries and refreshing them and rebuilding the indexes. Managing and keeping the result summary information fresh (e.g., eviction policies for result caches) may be a challenge for search engines providers. Techniques based on Time To Live (TTL) algorithms, Least Recently Used (LRU) algorithms, and Least Frequently Used (LFU) algorithms may not precisely help identifying what results are out of sync, but may merely be approaches to decide what to refresh. However, reports of received search content which does not match summary search result information may provide specific indications of what has gone stale. Such information may also help the converse situation (i.e., what need not be refreshed aggressively and which result cache entry TTLs can be extended). Additionally, search engines may delist a network address based upon a determination that received requested content is malicious and/or misleading. In case of the security agent user community collecting such information, the search results may be optimized by the browser component over what the search engine returns. For example, stale entries may be dropped from search results or visually indicated to improve user satisfaction and experience.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, search result management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
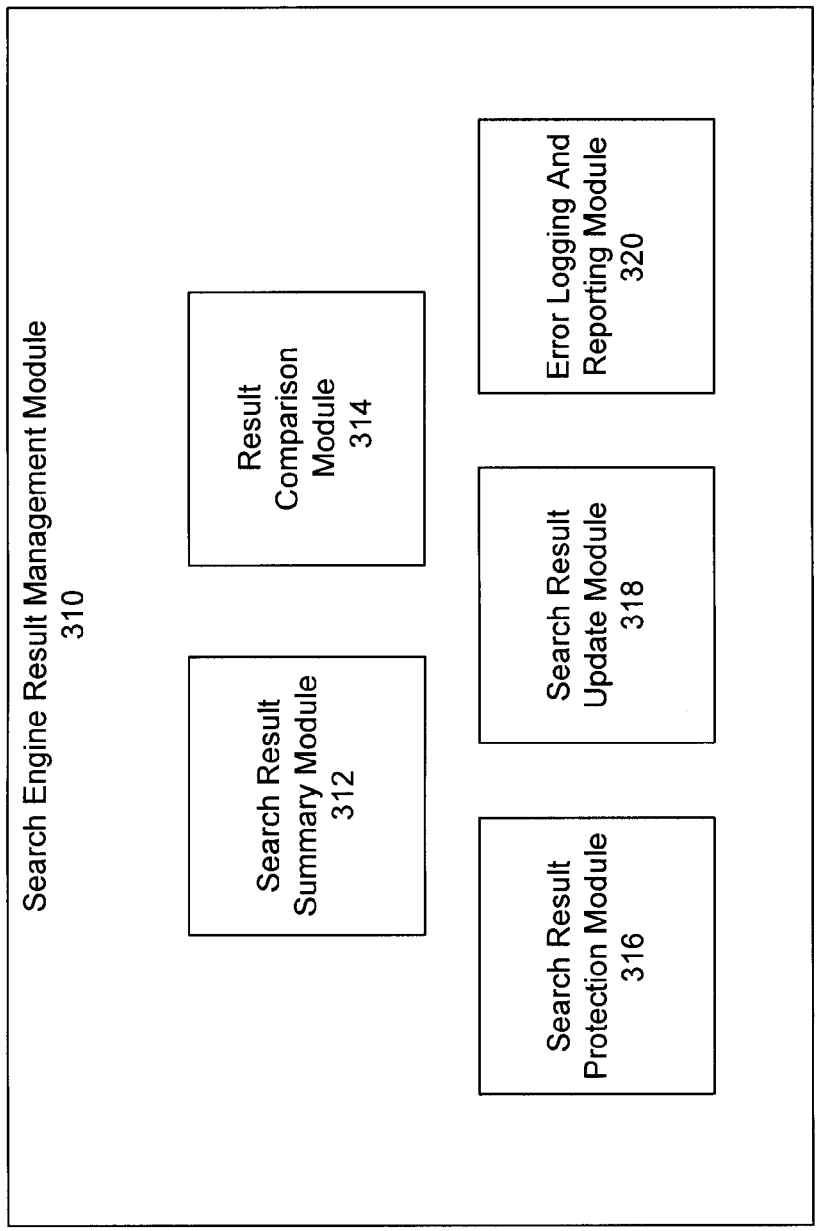
FIG. 3 shows a module for managing search engine results in accordance with an embodiment of the present disclosure.

Referring to FIG. 3, there is shown a search engine result management module 310 in accordance with an embodiment of the present disclosure. As illustrated, the search engine result management module 310 may contain one or more components including search result summary module 312, result comparison module 314, search result protection module 316, search result update module 318, and error logging and reporting module 320.

Search result summary module 312 may store or access search engine result summary information received in response to a web search (e.g., a search performed by client 110, 120, and/or 130 of FIG. 1). Search result summary information may contain information retrieved by a search engine while crawling a webpage. When a web search is performed a search engine may traverse an index using keywords contained in the search to retrieve relevant summary search engine results. Search result summary module 312 may store or access these results as they are provided to a web search requestor (e.g., client 110, 120, and/or 130 of FIG. 1).

Result comparison module 314 may compare search engine result summary information with results received in response to a request for a search result (e.g., a user of client 110, 120, and/or 130 of FIG. 1 clicks on a result link). Result comparison module 314 may search for a portion of search result summary information in the results received in response to the request. For example, result comparison module 314 may use a string of text from search engine result summary information and use a string search, regular expressions, or other mechanisms to compare the string from the summary results to the received results. A match containing an entire substring may indicate that the summary search engine results accurately represent the contents of the webpage. No match or an approximate substring match (e.g., minor variations found) may indicate modified content, updated content, stale cached summary results, and/or malicious or misleading content. If a match is made received results may be provided to a requestor. If an approximate match is made, according to some embodiments, further analysis may be performed to determine whether received results are current, safe, and/or relevant. If an approximate match is made a user may be provided with a warning or message regarding potential irrelevant or harmful content. According to some embodiments, if a match is not made one or more actions may be taken. Actions may be determined by one or more configurable policies. Determining which of the one or more actions to perform may be based on one or a similarity of the received requested content to the summary content derived from a comparison, a policy, and/or an analysis of the received requested content. Actions may be directed towards providing web user safety and reducing irrelevant, misleading, and outdated search results.

Search result protection module 316 may perform one or more protective actions. Actions may be determined by one or more configurable policies. Determining which of the one or more actions to perform may be based on one or a similarity of the received requested content to the summary content derived from a comparison, a policy, and/or an analysis of the received requested content. Actions may be directed towards providing web user safety and reducing irrelevant, misleading, and outdated search results.

According to some embodiments, if a match is not made search result protection module 316 may perform one or more actions to reduce a potential threat from malware and/or misleading applications. Malware may include misleading applications messages such as, for example, a fake anti-virus software product, a fake network security software product, a fake anti-spyware software product, a fake computer disk optimization software product, a fake operating system update software product, a fake operating system registry tool software product, and/or a fake computer optimization software product. Security measures to reduce such threats may include blocking the received requested content, warning a user regarding potential malicious content associated with the received requested content, and/or preventing downloads from a network address or web page associated with the received requested content. Other actions may include disabling at least a portion of browser functionality of a browser receiving the received requested content (e.g., disabling a JavaScript engine), disabling instantiation of ActiveX controls on a page associated with the received requested content, and/or preventing interaction with a web form of a page associated with the received requested content. Disabling functionality, forms, downloads and other web interaction may prevent the download of malware, the execution of malware, the gathering of sensitive information (e.g., user names, passwords, pins, account information, personal information, etc.). According to some embodiments, the restrictions may be configurable and/or set by one or more policies. Further analysis may be performed including the use of signatures to identify malware, behavioral analysis, and/or reputation based analysis (e.g., identifying network addresses associated with the received content as known malicious sites).

Search result update module 318 may notify a search engine that the summary content does not match the received requested content. Search result update module 318 may indicate to a search engine that web crawling for content should be expedited. Notifying a search engine that the page and/or content and the summary and indexed page information is not synchronized can be delivered to the community of the users of the security agent and/or to the search engine provider. A search engine may benefit from expiring the corresponding result cache entries and refreshing them and rebuilding the indexes. Reports of received search content which does not match summary search result information may provide specific indications of what has gone stale. Such information may also help the converse situation (i.e., what need not be refreshed aggressively and which result cache entry TTLs can be extended). Additionally, search engines may delist a network address based upon a determination that received requested content is malicious and/or misleading. In case of the security agent user community collecting such information, the search results may be optimized by the browser component over what the search engine returns. For example, stale entries may be dropped from search results or visually indicated to improve user satisfaction and experience.

Error logging and reporting module 320 may produce logs, reports, or other information associated with managing search engine results.

Figure 4A:
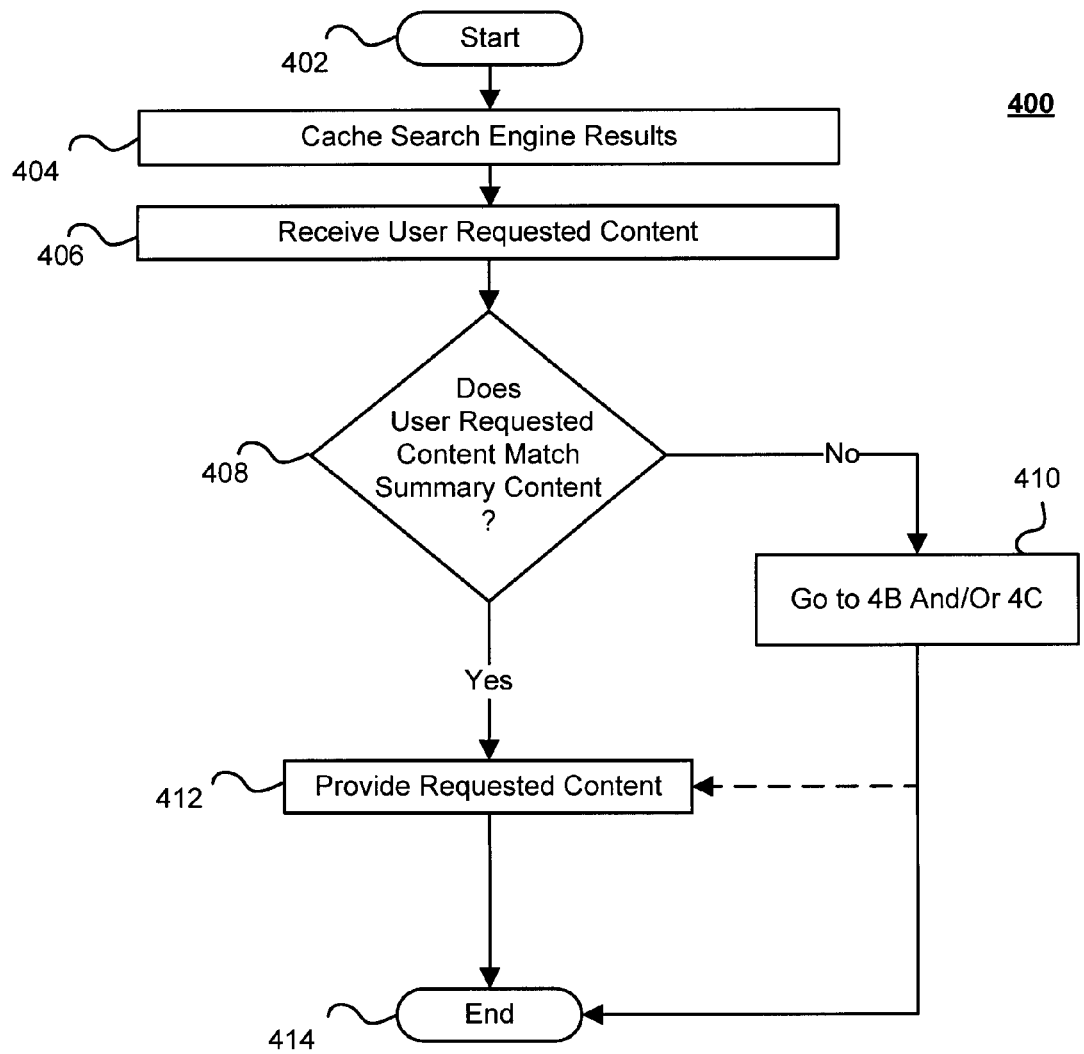
FIG. 4A depicts a method for managing search engine results in accordance with an embodiment of the present disclosure.

Referring to FIG. 4A, there is depicted a method 400 for managing search engine results in accordance with an embodiment of the present disclosure. At block 402, the method 400 may begin.

At block 404, search engine result summary information received in response to a web search (e.g., a search performed by client 110, 120, and/or 130 of FIG. 1) may be stored or accessed. Search result summary information may contain information retrieved by a search engine while crawling a webpage. When a web search is performed a search engine may traverse an index using keywords contained in the search to retrieve relevant summary search engine results. These results may be stored or accessed as they are provided to a web search requestor (e.g., client 110, 120, and/or 130 of FIG. 1). According to some embodiments, these results may not be accessed until a search result is requested.

At block 406, user requested content may be received (e.g., a user of client 110, 120, and/or 130 of FIG. 1 may click on a result link).

At block 408, search engine result summary information may be compared with results received in response to a request for a search result. A search for a portion of search result summary information in results received in response to a request for a search result. For example, a string of text from search engine result summary information may be used in a string search, regular expression, or other mechanism to compare the string from the summary results to the received results. A match containing an entire substring may indicate that the summary search engine results accurately represent the contents of the webpage. No match or an approximate substring match (e.g., minor variations found) may indicate modified content, updated content, stale cached summary results, and/or malicious or misleading content. If a match is made the method may continue at block 412. According to one or more embodiments, if an approximate match is made the method may continue at block 412. According to some embodiments, if an approximate match is made and/or if a match is not made the method may continue at block 410.

At block 410, the method may continue at block 416 of 4B and/or 430 of 4C. According to some embodiments, the method may fork and may also continue at block 412. The branch or branches taken may depend upon the results of a comparison between summary search engine results and received requested search results, as well as one or more policies, user input, further analysis, and/or other security and content relevancy factors.

At block 412, requested content may be provided to a user.

At block 414, the method 400 may end.

Figure 4B:
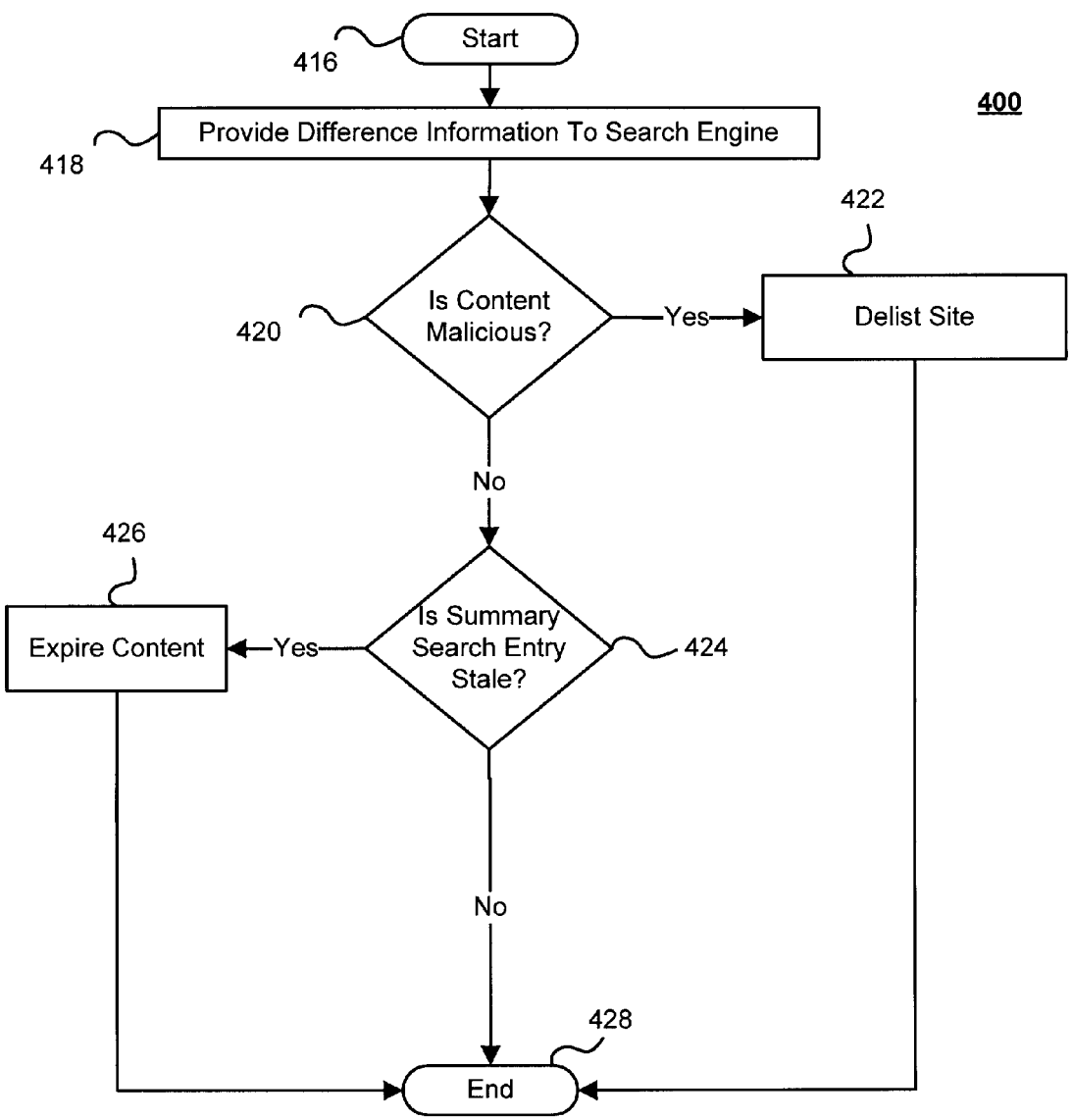
FIG. 4B depicts a method for managing summary search engine content in accordance with an embodiment of the present disclosure.

FIG. 4B depicts a method for managing summary search engine content in accordance with an embodiment of the present disclosure. At block 416, the method 400 may continue.

At block 418, a search engine may be notified that summary search engine content does not match received requested search results. Notification may be made via email, SMS, web services, and/or other APIs and interfaces.

At block 420, it may be determined whether content is malicious. Further analysis may be performed including the use of signatures to identify malware, behavioral analysis, and/or reputation based analysis (e.g., identifying network addresses associated with the received content as known malicious sites).

At block 422, a search engine may delist a network address based upon a determination that received requested content is malicious and/or misleading.

At block 424, it may be determined whether a summary search entry is stale. If a summary search entry is stale (e.g., a page associated with the summary has changed since a webcrawler retrieved the information) the method may continue at block 426. If a summary search entry is not stale, the method may end at block 428.

At block 426, a search engine may expedite web crawling for content associated with the stale summary search entry. Notifying a search engine that the page and/or content and the summary and indexed page information is not synchronized may be delivered to the community of the users of the security agent and/or to the search engine provider. A search engine may benefit from expiring the corresponding result cache entries and refreshing them and rebuilding the indexes. Reports of received search content which does not match summary search result information may provide specific indications of what has gone stale. Such information may also help the converse situation (i.e., what need not be refreshed aggressively and which result cache entry TTLs can be extended). In case of the security agent user community collecting such information, the search results may be optimized by the browser component over what the search engine returns. For example, stale entries may be dropped from search results or visually indicated to improve user satisfaction and experience.

At block 428, the method may end.

Figure 4C:
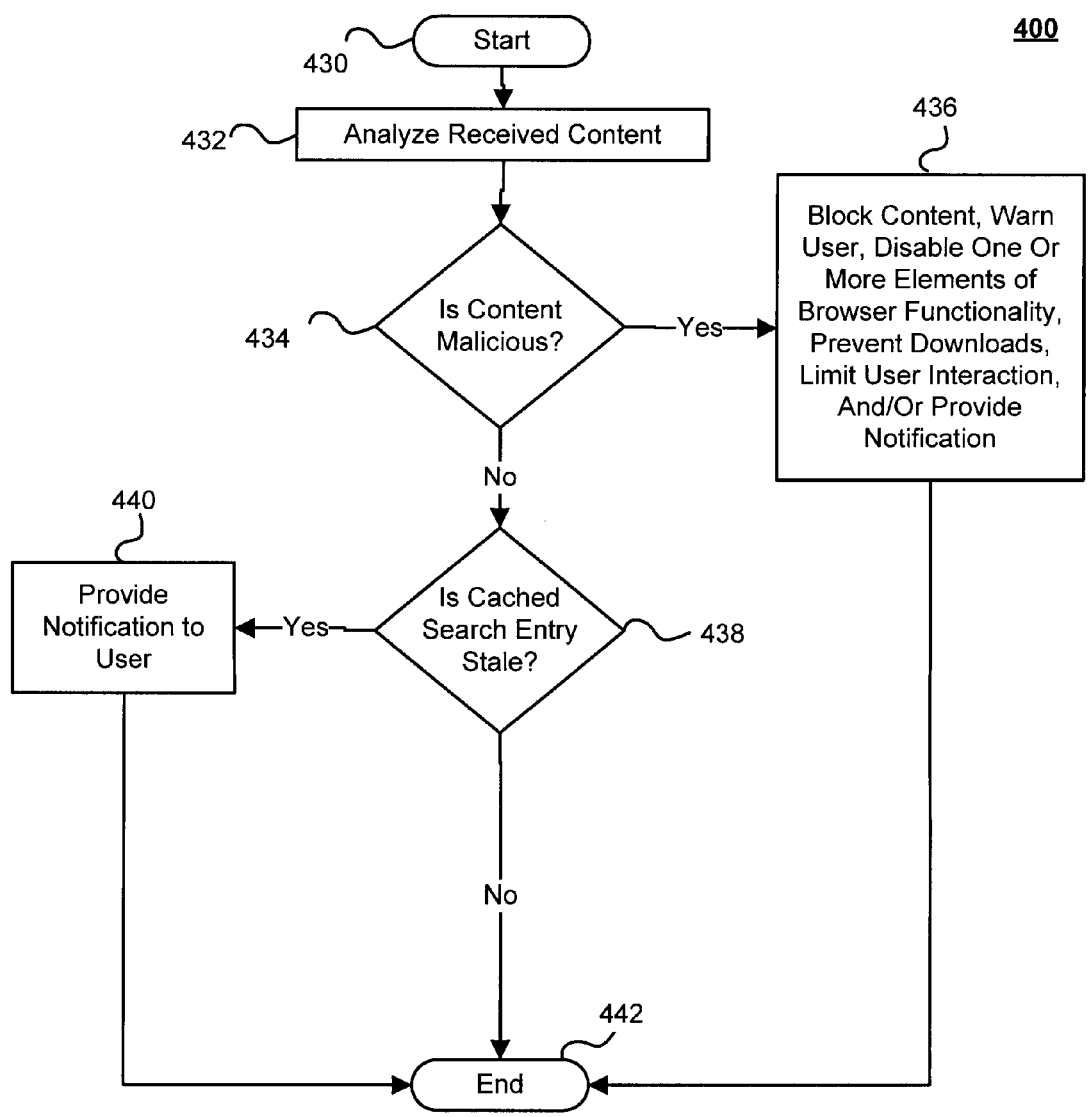
FIG. 4C depicts a method for managing malicious search engine results in accordance with an embodiment of the present disclosure.

FIG. 4C depicts a method for managing malicious search engine results in accordance with an embodiment of the present disclosure. At block 430, the method 400 may continue.

At block 432, received content may be analyzed. Further analysis may be performed including the use of signatures to identify malware, behavioral analysis, and/or reputation based analysis (e.g., identifying network addresses associated with the received content as known malicious sites).

At block 434, it may be determined whether content is malicious and/or misleading. If content is malicious and/or misleading the method may continue at block 436. If content is not malicious and/or misleading the method may continue at block 438.

At block 436, one or more actions may be performed to reduce a potential threat from malware and/or misleading applications. Security measures to reduce such threats may include blocking the received requested content, warning a user regarding potential malicious content associated with the received requested content, and/or preventing downloads from a network address or web page associated with the received requested content. Other actions may include disabling at least a portion of browser functionality of a browser receiving the received requested content (e.g., disabling a JavaScript engine), disabling instantiation of ActiveX controls on a page associated with the received requested content, and/or preventing interaction with a web form of a page associated with the received requested content. Disabling functionality, forms, downloads and other web interaction may prevent the download of malware, the execution of malware, the gathering of sensitive information (e.g., user names, passwords, pins, account information, personal information, etc.). According to some embodiments, the restrictions may be configurable and/or set by one or more policies. Further analysis may be performed including the use of signatures to identify malware, behavioral analysis, and/or reputation based analysis (e.g., identifying network addresses associated with the received content as known malicious sites).

At block 438, it may be determined whether a summary search entry is stale. If a summary search entry is stale the method may continue at block 440. If a summary search entry is not stale, the method may end at block 442.

At block 440, a user may be notified that received search results do not match summary search engine results and that this may indicate that received content has been updated, is not relevant to the search, and/or is misleading. A user may be provided with one or more options including, but not limited to previewing an excerpt of a page, blocking a page, notifying an administrator and/or viewing a page with one or more safeguards. According to some embodiments, a user may add a page to a whitelist of pages whose content is known to change frequently. Options may depend on a role associated with a user, a policy, analysis of received web content, a level of difference between received web content and summary search results, and other factors.

At block 442, the method may end.

At this point it should be noted that managing search engine results in accordance with the present disclosure as described above typically involves the processing of input data and the generation of output data to some extent. This input data processing and output data generation may be implemented in hardware or software. For example, specific electronic components may be employed in a search result management module or similar or related circuitry for implementing the functions associated with managing search engine results in accordance with the present disclosure as described above. Alternatively, one or more processors operating in accordance with instructions may implement the functions associated with managing search engine results in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing search engine results comprising:
    receiving a search engine result and associated summary content;
    receiving requested content associated with the search engine result;
    comparing, using a computer processor, the summary content and the received requested content; and
    performing one or more actions in the event the summary content does not match the received requested content.

2. The method of claim 1, wherein the one or more actions comprise notifying a search engine that the summary content does not match the received requested content.

3. The method of claim 2, further comprising expediting crawling web content based upon a received notification that summary content does not match the received requested content.

4. The method of claim 2, further comprising delisting a network address based upon a determination that received requested content is malicious.

5. The method of claim 1, wherein the one or more actions comprise indicating to a user that summary content is stale.

6. The method of claim 1, wherein the one or more actions comprise providing the received requested content to a user.

7. The method of claim 1, wherein the one or more actions comprise blocking the received requested content.

8. The method of claim 1, wherein the one or more actions comprise warning a user regarding potential malicious content associated with the received requested content.

9. The method of claim 1, wherein the one or more actions comprise preventing downloads from a network address associated with the received requested content.

10. The method of claim 1, wherein the one or more actions comprise one or more of: disabling at least a portion of browser functionality of a browser receiving the received requested content, disabling instantiation of ActiveX controls on a page associated with the received requested content, and preventing interaction with a web form of a page associated with the received requested content.

11. The method of claim 1, wherein the one or more actions comprise providing a notification to at least one of: an administrator, a security software vendor, a third party solution provider, and one or more additional search engine clients.

12. The method of claim 1, further comprising determining which of the one or more actions to perform based on at least one of: a similarity of the received requested content to the summary content derived from the comparison, a policy, and an analysis of the received requested content.

13. The method of claim 1, further comprising determining that the received requested content is associated with one or more of malware and misleading content, wherein the determination is based on one or more of: a signature, behavioral analysis, and reputation based analysis.

14. The method of claim 1, wherein comparing comprises performing a string search for one or more portions of the summary content in the received requested content.

15. The method of claim 1, wherein one or more portions of functionality are performed by at least one of: a browser API, a browser plug-in, and a browser component.

16. The method of claim 1, wherein one or more portions of functionality are performed by a gateway, a web proxy, and a search engine.

17. At least one processor readable non-transitory storage medium for storing a computer program of instructions configured to be readable by at least one processor for instructing the at least one processor to execute a computer process for performing the method as recited in claim 1.

18. An article of manufacture for managing search engine results, the article of manufacture comprising:
- at least one non-transitory processor readable medium; and
- instructions stored on the at least one medium;
- wherein the instructions are configured to be readable from the at least one medium by at least one processor and thereby cause the at least one processor to operate so as to:
  - receive a search engine result and associated summary content;
  - receive requested content associated with the search engine result;
  - compare, using a computer processor, the summary content and the received requested content; and
  - perform one or more actions in the event the summary content does not match the received requested content.

19. A system for managing search engine results comprising:
- one or more processors communicatively coupled to a network; wherein the one or more processors are configured to:
  - receive a search engine result and associated summary content;
  - receive requested content associated with the search engine result;
  - compare, using a computer processor, the summary content and the received requested content; and
  - perform one or more actions in the event the summary content does not match the received requested content.

20. The system of claim 19, wherein the one or more processors are further configured to:
- expedite crawling web content based upon a received notification that summary content does not match the received requested content.

* * * * *